(12) United States Patent
Hashimoto et al.

(10) Patent No.: US 8,940,201 B2
(45) Date of Patent: Jan. 27, 2015

(54) CORRECTING APPARATUS OF SEAMLESS BELT, AND CORRECTING METHOD OF SEAMLESS BELT

(75) Inventors: Katsunori Hashimoto, Toyokawa (JP); Yoshiyuki Mizumo, Kaizuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 817 days.

(21) Appl. No.: 12/796,224

(22) Filed: Jun. 8, 2010

(65) Prior Publication Data

US 2010/0308514 A1  Dec. 9, 2010

(51) Int. Cl.
| | | |
|---|---|---|
| B29C 73/28 | (2006.01) | |
| B29C 73/30 | (2006.01) | |
| B29C 73/32 | (2006.01) | |
| B29C 59/02 | (2006.01) | |
| B29C 35/04 | (2006.01) | |
| B29C 49/48 | (2006.01) | |
| B29C 49/62 | (2006.01) | |
| B29C 49/00 | (2006.01) | |
| B29K 81/00 | (2006.01) | |
| B29K 105/00 | (2006.01) | |
| B29L 29/00 | (2006.01) | |

(52) U.S. Cl.
CPC ............. B29C 59/021 (2013.01); *B29C 35/041* (2013.01); *B29C 49/4823* (2013.01); *B29C 49/62* (2013.01); *B29C 2049/0089* (2013.01); *B29K 2081/04* (2013.01); *B29K 2105/258* (2013.01); *B29L 2029/00* (2013.01)
USPC .............. 264/36.12; 425/35; 425/39; 425/40; 425/52; 425/53; 425/387.1

(58) Field of Classification Search
USPC .......... 264/36.12; 425/39, 503, 35, 40, 43, 44, 425/52, 53, 387.1, 389
See application file for complete search history.

(56) References Cited

U.S. PATENT DOCUMENTS

| | | | |
|---|---|---|---|
| 5,019,318 A * | 5/1991 | Mattson | 264/315 |
| 2004/0149429 A1* | 8/2004 | Dilber et al. | 166/134 |
| 2009/0139707 A1* | 6/2009 | Berzin et al. | 166/118 |

FOREIGN PATENT DOCUMENTS

| | | |
|---|---|---|
| JP | 04-303628 | 10/1992 |
| JP | 07-178840 | 7/1995 |
| JP | 2001-96551 A | 4/2001 |
| JP | 2006-341485 | 12/2006 |
| JP | 2009-066925 | 4/2009 |

OTHER PUBLICATIONS

Takechi et al., JP 2006-341485 A Translation, Dec. 2006.*
Ashibe, JP 2009-066925 Translation, Apr. 2009.*

(Continued)

*Primary Examiner* — Ryan Ochylski
(74) *Attorney, Agent, or Firm* — Buchanan Ingersoll & Rooney PC

(57) ABSTRACT

A correcting apparatus of a seamless belt includes a bottomed cylindrical main body that has an inner peripheral surface formed of mirror surface and that accommodates a seamless belt at a distance from the inner peripheral surface, a lid body detachably attached to the main body, a fixing unit that fixes an upper end and a lower end of the seamless belt to the mirror surface, a pressing unit that presses the seamless belt accommodated in the main body against the mirror surface, and a heating unit that heats the mirror surface.

5 Claims, 5 Drawing Sheets

(56) References Cited

OTHER PUBLICATIONS

Office Action (Notification of Reason for Refusal) dated Apr. 26, 2011, issued in the corresponding Japanese Patent Application No. 2009-138144, and an English Translation thereof.

Office Action issued in corresponding Chinese Patent Application No. 201010198290.7, dated Oct. 16, 2012, and English translation thereof.

* cited by examiner

CORRECTING APPARATUS OF SEAMLESS BELT, AND CORRECTING METHOD OF SEAMLESS BELT

This application is based on application No. 2009-138144 filed in Japan on Jun. 9, 2009, the contents of which are hereby incorporated by reference.

BACKGROUND OF THE INVENTION

1. Field of the Invention

The present invention relates to a correcting apparatus and a correcting method of a seamless belt for correcting lines or irregularities generated on a surface of the seamless belt when the seamless belt is produced from a PPS (polyphenylene sulfide) resin by an extrusion.

2. Description of the Related Art

As conventional producing methods of a seamless belt, there are a centrifugal molding method and an extrusion method. In the centrifugal molding method, when a seamless belt is formed mainly of a polyimide resin, a cylindrical mold 91 is rotated as shown in FIG. 7, and the seamless belt consisting of an endless seamless belt having uniform thickness is formed by spraying a liquid polyimide resin as a raw material of the seamless belt with a supply nozzle 92 or flowing the resin onto an inner peripheral surface of the cylindrical mold 91 (see Japanese Patent Application Laid-open No. 2001-96551).

There is a method in which a seamless belt is produced by extruding a PPS resin without using the centrifugal molding method, but there is a problem that lines or irregularities are generated on a surface of the seamless belt.

SUMMARY OF THE INVENTION

A correcting apparatus of a seamless belt according to the present invention includes:
a bottomed cylindrical main body that has an inner peripheral surface formed of mirror surface and that accommodates a seamless belt at a distance from the inner peripheral surface,
a lid body detachably attached to the main body,
a fixing unit that fixes an upper end and a lower end of the seamless belt to the mirror surface,
a pressing unit that presses the seamless belt accommodated in the main body against the mirror surface, and
a heating unit that heats the mirror surface.

In addition, the present invention provides a correcting method of a seamless belt including the steps of:
accommodating the seamless belt along an inner peripheral surface formed of mirror surface of a cylindrical mold,
fixing an upper end and a lower end of the seamless belt to the mirror surface,
pressing the seamless belt against the mirror surface toward outside from a center of the seamless belt, and
heating the mirror surface.

DETAILED DESCRIPTION OF THE INVENTION

An embodiment of the present invention will be described in detail with reference to the accompanying drawings.

Figure 1:
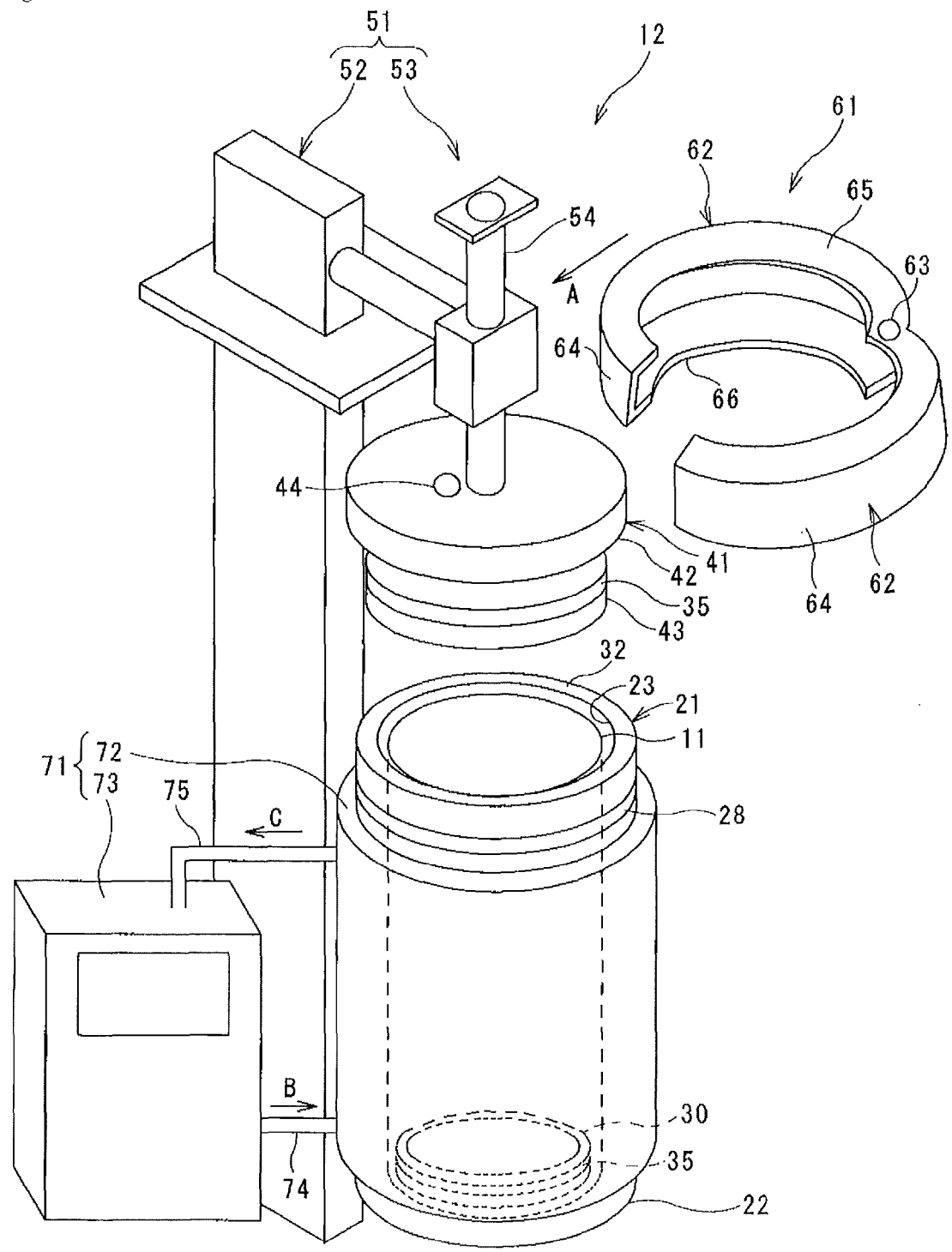
FIG. 1 is a perspective view showing a correcting apparatus of a seamless belt according to an embodiment of the present invention.

FIG. 1 shows a correcting apparatus 12 of a seamless belt 11 according to the embodiment of the present invention. The correcting apparatus 12 includes a main body 21 that accommodates the seamless belt 11 therein, a lid body 41 that can be detached from the main body 21, a support member 51 that detachably supports the lid body 41 on the main body 21, and a heating device 71 that is a heating unit for heating an inner peripheral surface of the main body 21.

The seamless belt 11 is a tube-like belt having a thickness of 50 μm to 300 μm, and is used as a transfer belt.

Figure 2:
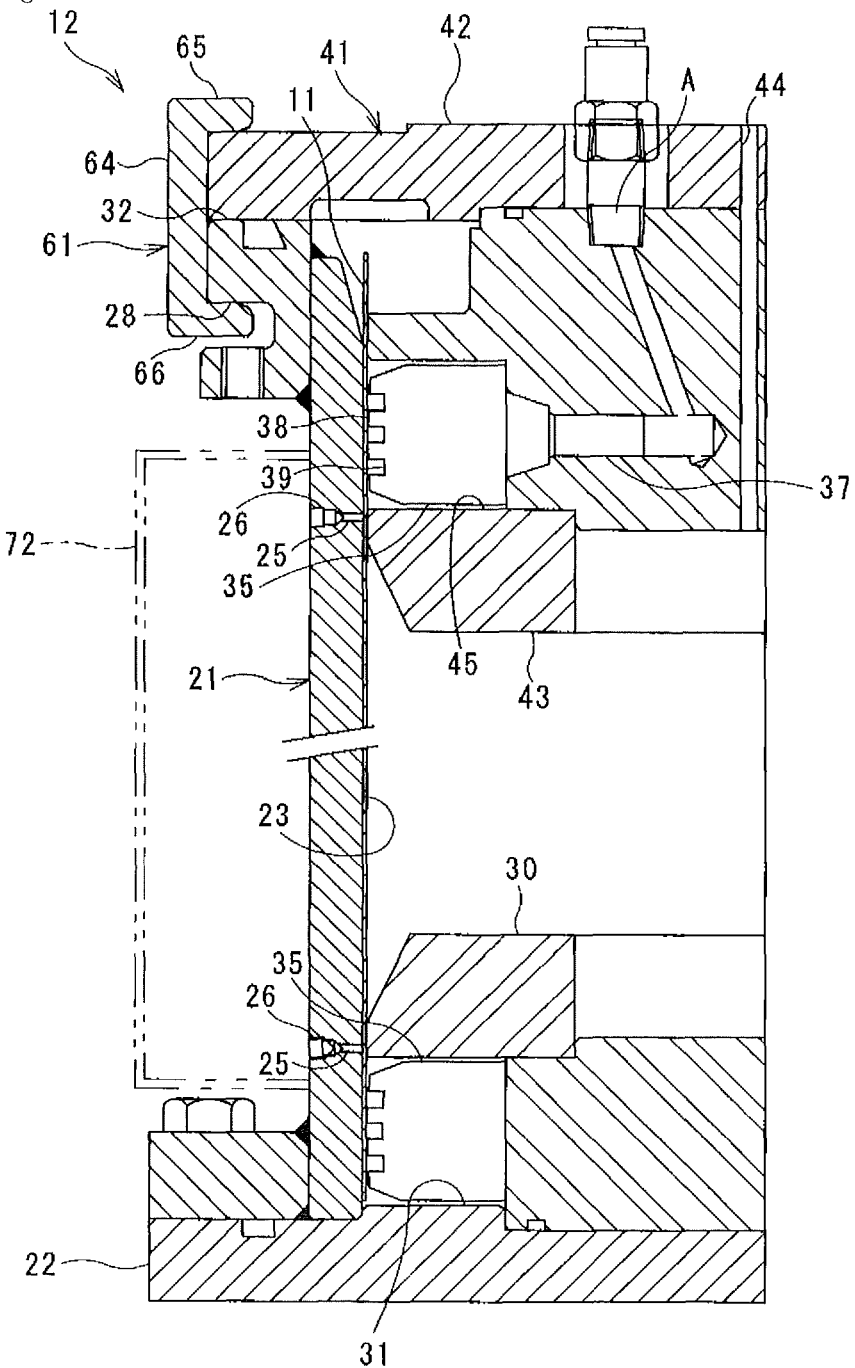
FIG. 2 is a partial enlarged sectional view of the correcting apparatus of the seamless belt shown in FIG. 1.

The main body 21 is a bottomed cylindrical mold that is integrally formed with a bottom body 22, and its inner peripheral surface 23 is mirror finished. As shown in FIG. 2, the main body 21 includes guide grooves 25 formed in a circumferential direction of the inner peripheral surface 23, and communication holes 26 extending from the corresponding guide groove 25 to an outside of the main body 21. The guide grooves 25 are provided at two locations, i.e., at an upper side and a lower side of the main body 21 between two O-rings 35 that are later-described fixing unit. The communication holes 26 are holes extending radially outward from the respective guide grooves 25, and the communication holes 26 bring an exterior and an interior of the main body 21 into communication with each other. An engaging groove 28 that is engaged with a later-described clamp 61 is provided on an upper portion of the main body 21 in its circumferential direction. The main body 21 can withstand an internal pressure of 1 Mpa for example.

A columnar projecting portion 30 extending upward from the bottom body 22 is provided on the bottom body 22. A groove 31 is provided between the bottom body 22 and the projecting portion 30 in the circumferential direction, and the O-ring 35 is fitted in the groove 31.

The lid body 41 includes a disk-like disk portion 42 that is in intimate contact with an upper end surface 32 of the main body 21, and a projecting portion 43 projecting downward from the disk portion 42. As shown in FIG. 2, a through hole 44 is formed in the lid body 41 so as to pass through the disk portion 42 and the projecting portion 43. High pressure air that is a pressing unit can be sent into the main body 21 from outside of the main body 21 through the through hole 44. The lid body 41 is made of metal. A groove 45 is provided in the projecting portion 43 in its circumferential direction, and the O-ring 35 is fitted into the groove 45.

Figure 3:
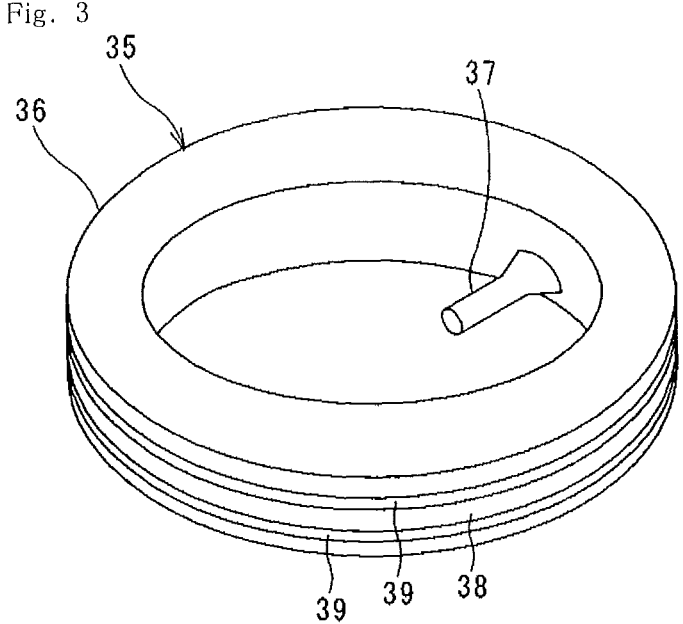
FIG. 3 is a perspective view of an O-ring shown in FIG. 2.

As shown in FIG. 3, the O-ring 35 is hollow, and includes a ring portion 36 that can be expanded by injecting air, and an injection valve 37 through which air is injected into the ring portion 36. The ring portion 36 can withstand the internal pressure of 0.8 Mpa for example. A plurality of recesses 39 are formed in an outer peripheral surface 38 of the ring portion 36 in its circumferential direction.

The support member 51 is a known support member including a base portion 52 extending vertically and an arm portion 53 extending horizontally from the base portion 52. A lower end of a columnar portion 54 of the arm portion 53 that can be adjusted in position in the vertical direction is connected to the lid body 41.

The lid body 41 is mounted on the main body 21 by the support member 51. The lid body 41 is fixed to the main body 21 by a known clamp 61. The clamp 61 has a cross section of U-shape, and consists of two semi-circular annular portions 62 which open and close around a shaft 63. The annular portion 62 includes a peripheral wall 64, an upper wall 65 extending from an upper end of the peripheral wall 64 toward a center, and a bottom wall 66 extending from a lower end of the peripheral wall 64 toward the center. In a state where the annular portions 62 are opened, the clamp 61 is moved in the direction of the arrow A, and the annular portions 62 are closed at a location where the centers of the lid body 41, the main body 21 and the clamp 61 match with one another. With this, the upper wall 65 of the clamp 61 is engaged with an upper surface of the lid body 41, the bottom wall 66 is engaged with the engaging groove 28 of the main body 21, thereby fixing the lid body 41 to the main body 21.

The heating device 71 is a known heating device including a hot water jacket 72 wound around an outer peripheral surface of the main body 21, and a temperature controller 73 that controls a water temperature in the hot water jacket 72. Hot water is heated or cooled in the temperature controller 73, and the water is sent into the hot water jacket 72 in the direction of the arrow B through a flow-in pipe 74. The hot water circulates in the hot water jacket 72, and heats or cools the mirror surface 23 through the main body 21. The hot water is returned to the temperature controller 73 from the hot water jacket 72 through a flow-out pipe 75 in the direction of the arrow C. The heating device 71 is not limited to the hot water jacket 72 as long as it heats the mirror surface 23, and a surface heat element such as a band heater may be wound around the outer peripheral surface of the main body 21.

Next, the operation of the correcting apparatus 12 of the seamless belt 11 having the above-described structure, i.e., the procedure of the correcting method of the seamless belt 11 will be explained.

Figure 4:
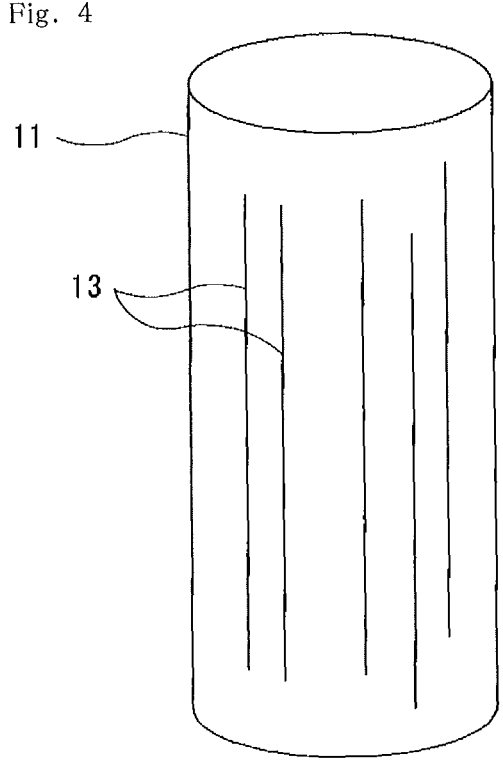
FIG. 4 is a perspective view of a seamless belt formed with lines on its surface generated by an extrusion.

As shown in FIG. 4, an infinite number of lines 13 are generated on the surface of the seamless belt 11 produced by the extrusion during the producing procedure. Depths of the lines 13 are about several μm.

To correct the lines 13, the seamless belt 11 is first accommodated in the main body 21. At that time, since the O-ring 35 of the bottom body 22 is shrunk, a gap is created between the O-ring 35 and the mirror surface 23, and the seamless belt 11 can be accommodated in the main body 21. The accommodated seamless belt 11 is disposed at a predetermined distance from the mirror surface 23 inside the mirror surface 23. Next, the lid body 41 is moved toward the main body 21 by the support member 51 so that the peripheral edge of the disk portion 42 can be brought into intimate contact with the upper end surface 32 of the main body 21. The lid body 41 is fixed to the main body 21 by the clamp 61, thereby hermetically closing the inside of the main body 21.

Here, air is injected into the ring portion 36 from a pipe shown with A in FIG. 2 provided in the lid body 41 through the injection valve 37 to expand the ring portion 36. With this, the outer peripheral surface 38 of the ring portion 36 presses the seamless belt 11 against the mirror surface 23, and a predetermined gap between the mirror surface 23 and the seamless belt 11 is hermetically closed between the upper and lower two O-rings 35. With this, the seamless belt 11 can be fixed to the mirror surface 23.

Next, high pressure air is sent into the main body 21 from the through hole 44 of the lid body 41, thereby increasing the pressure in the main body 21, and the entire surface of the seamless belt 11 is pressed against the mirror surface 23 between the two O-rings 36. Since the guide groove 25 and the communication hole 26 are formed in the main body 21, when the seamless belt 11 is pressed against the mirror surface 23, air accumulated between the seamless belt 11 and the mirror surface 23 can be discharged outside from the guide groove 25 through the communication hole 26.

The mirror surface 23 is heated by the hot water jacket 72 to 35 to 70° C., e.g., 55° C. as preheating temperature. With this preheating, the entire seamless belt 11 can equally be heated. Therefore, when the main body 21 is subjected to the high pressure and the seamless belt 11 is pressed and expanded, generation of wrinkles due to uneven thickness or deviation can be prevented.

If a predetermined time is elapsed, the mirror surface 23 is heated to a temperature at which the seamless belt 11 is softened, e.g., about 90° C. The seamless belt 11 is heated by this heating operation and the preheating operation for 30 minutes in total for example. With this, the thermoplastic seamless belt 11 pressed against the mirror surface 23 is softened, and the surface of the seamless belt 11 comes into pressure contact with the mirror surface 23. Therefore, a state of the mirror surface 23 is transferred to the surface of the seamless belt 11, lines 13 and irregularities on the surface of the seamless belt 11 generated by the extrusion can be eliminated, and the surface of the seamless belt 11 can be brought into the mirror surface state. The mirror surface state means that depths of the lines 13 and the irregularities are less than 1 μm.

Figure 5:
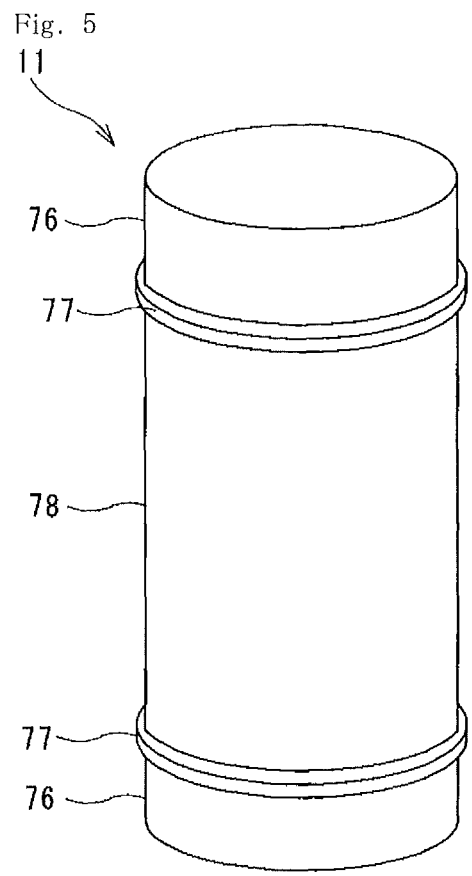
FIG. 5 is a perspective view of the seamless belt whose surface is mirror finished by the correcting apparatus shown in FIG. 1.
Figure 6:
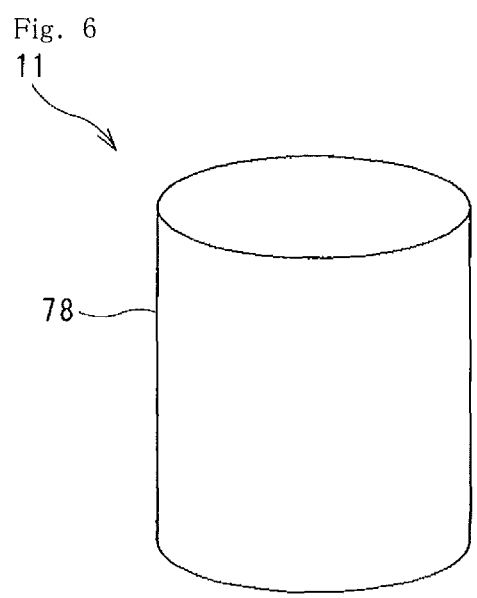
FIG. 6 is a perspective view of the seamless belt shown in FIG. 5 from which outer sides from traces of guide grooves are cut down.
Figure 7:
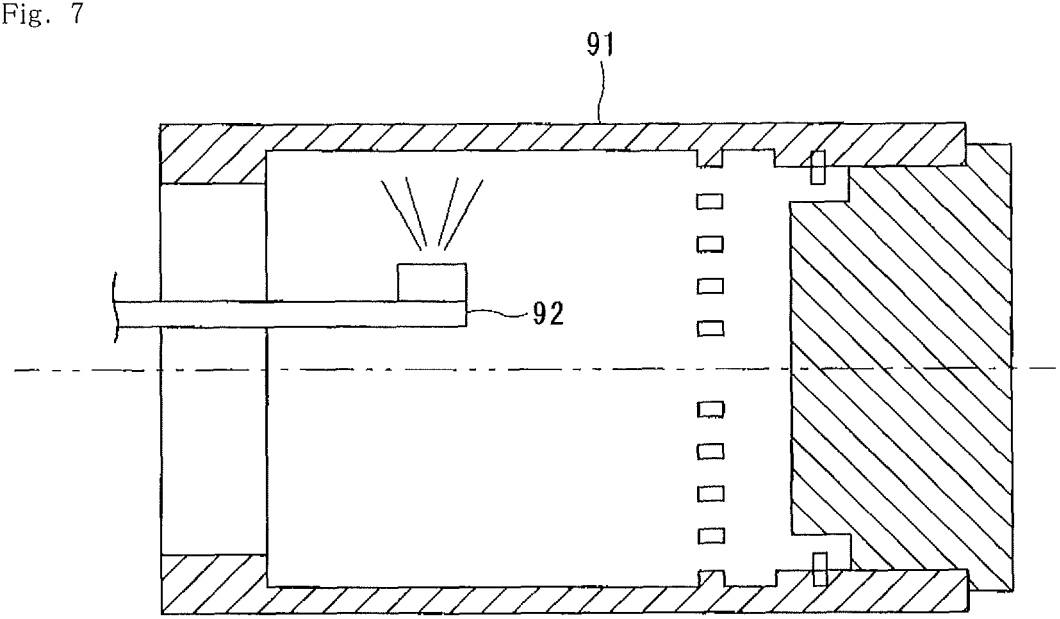
FIG. 7 is a sectional view of a conventional cylindrical mold used when a seamless belt is formed from a polyimide resin.

In this embodiment, if the seamless belt 11 after heated is taken out from the main body 21, traces 77 of the guide grooves 25 are formed between portions 76 fixed to the two O-rings 35 as shown in FIG. 5, and a portion 78 sandwiched between the traces 77 of the two guide grooves 25 is formed into the mirror surface. Therefore, if the outer sides from the traces 77 including the traces 77 of the guide grooves 25 are cut off, a seamless belt 11 having a surface formed into the mirror surface shown in FIG. 6 can be obtained.

The present invention is not limited to the above embodiment, and can variously be modified.

The preheating temperature and the softening temperature are not especially limited as long as the mirror surface state can be transferred to the surface of the seamless belt 11. Similarly, the heating time of the seamless belt 11 is not especially limited as long as the mirror surface state can be transferred to the surface of the seamless belt 11.

When the main body 21 is always maintained at for example 55° C. that is the preheating temperature, the seamless belt 11 is accommodated in and fixed to the main body 21, and the surface of the seamless belt 11 is pressed against the mirror surface 23. Then, the mirror surface 23 is heated to, for example, about 90° C. at which the seamless belt 11 is softened, and the state of the mirror surface 23 is transferred to the surface of the seamless belt 11. Thereafter, the temperature is lowered to the preheating temperature. With this, this operation can continuously be carried out.

As described above, a correcting apparatus of a seamless belt according to the present invention includes:

a bottomed cylindrical main body that has an inner peripheral surface formed of mirror surface and that accommodates a seamless belt at a distance from the inner peripheral surface, a lid body detachably attached to the main body, a fixing unit that fixes an upper end and a lower end of the seamless belt to the mirror surface, a pressing unit that presses the seamless belt accommodated in the main body against the mirror surface, and a heating unit that heats the mirror surface.

By heating the mirror surface, the thermoplastic seamless belt pressed against the mirror surface by the pressing unit is softened, and the surface of the seamless belt comes into pressure contact with the mirror surface that is the inner peripheral surface. With this, the state of the mirror surface is transferred to the surface of the seamless belt, lines and irregularities on the surface of the seamless belt generated by the extrusion are eliminated, and the surface of the seamless belt is brought into the mirror surface state. Here, the mirror surface state means that depths of the lines and the irregularities on the surface of the seamless belt are less than 1 µm.

The fixing unit is preferably an O-ring that can be expanded by injecting air thereinto.

The O-ring expands if air is injected thereinto. Therefore, the seamless belt is accommodated in the main body in a state where the O-ring shrinks, the mirror surface is fixed to the seamless belt in a state where the O-ring expands, and the gap between the mirror surface and the seamless belt can hermetically be closed.

The pressing unit preferably presses the seamless belt against the mirror surface by increasing an air pressure in the main body.

With this, the seamless belt can uniformly be pressed against the mirror surface.

Preferably, the heating unit heats the mirror surface at a preheating temperature that is lower than a softening temperature at which the seamless belt is softened and then, the heating unit heats the seamless belt up to the softening temperature.

By heating the seamless belt at the preheating temperature, the entire seamless belt can uniformly be softened. Thus, when the seamless belt is pressed and expanded, wrinkles due to uneven thickness or deviation can be prevented.

The main body preferably includes a guide groove formed in a circumferential direction in the inner peripheral surface and a communication hole that communicates the guide groove to outside.

With this, air accumulated between the mirror surface and the seamless belt is released when the seamless belt is pressed against the mirror surface, and the surface of the seamless belt can uniformly be formed.

In addition, the present invention provides a correcting method of a seamless belt including the steps of:

accommodating the seamless belt along an inner peripheral surface formed of mirror surface of a cylindrical mold, fixing an upper end and a lower end of the seamless belt to the mirror surface, pressing the seamless belt against the mirror surface toward outside from a center of the seamless belt, and heating the mirror surface.

By heating the mirror surface, the thermoplastic seamless belt pressed against the mirror surface is softened, and the surface of the seamless belt comes into pressure contact with the mirror surface that is the inner peripheral surface. With this, the mirror surface state is transferred to the surface of the seamless belt, lines and irregularities on the surface of the seamless belt generated by the extrusion are eliminated, and the surface of the seamless belt can be brought into the mirror surface state.

The seamless belt is preferably pressed against the mirror surface by increasing an air pressure in the main body.

With this, the seamless belt can uniformly be pressed against the mirror surface.

Preferably, the mirror surface is heated at a preheating temperature that is lower than a softening temperature at which the seamless belt is softened and then, the mirror surface is heated up to the softening temperature.

By heating the seamless belt at the preheating temperature, the entire seamless belt can be softened. Thus, when the seamless belt is pressed and expanded, wrinkles due to uneven thickness or deviation can be prevented.

When the seamless belt is pressed against the mirror surface, air existing between the mirror surface and the seamless belt is preferably discharged outside of the main body.

By releasing air accumulated between the mirror surface and the seamless belt, the surface of the seamless belt can uniformly be formed.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A correcting method of a seamless belt comprising the steps of:

accommodating the seamless belt along an inner peripheral surface of mirror surface of a cylindrical mold, fixing an upper end and a lower end of the seamless belt to the mirror surface by pressing the upper end and the lower end of the seamless belt against the mirror surface, pressing a middle portion of the seamless belt, located between the upper end and the lower end of the seamless belt, against the mirror surface toward outside from a center of the seamless belt after the fixing unit has fixed the upper end and the lower end of the seamless belt to the mirror surface, and heating the mirror surface.

2. The correcting method of a seamless belt according to claim 1, wherein the seamless belt is pressed against the mirror surface by increasing an air pressure in the main body.

3. The correcting method of a seamless belt according to claim 1, wherein the mirror surface is heated at a preheating temperature that is lower than a softening temperature at which the seamless belt is softened and then, the mirror surface is heated up to the softening temperature.

4. The correcting method of a seamless belt according to claim 1, wherein when the seamless belt is pressed against the mirror surface, air existing between the mirror surface and the seamless belt is discharged outside of the main body.

5. The correcting method of a seamless belt according to claim 1, wherein fixing the upper end of the seamless belt to the mirror surface includes injecting air into an O-ring possessing a hollow interior to inflate the O-ring.

* * * * *

UNITED STATES PATENT AND TRADEMARK OFFICE
CERTIFICATE OF CORRECTION

PATENT NO. : 8,940,201 B2
APPLICATION NO. : 12/796224
DATED : January 27, 2015
INVENTOR(S) : Katsunori Hashimoto et al.

Page 1 of 1

It is certified that error appears in the above-identified patent and that said Letters Patent is hereby corrected as shown below:

On the Title Page, insert

-- (30) Foreign Application Priority Data

June 9, 2009 (JP)................2009-138144 --

Signed and Sealed this
Twenty-first Day of July, 2015

Michelle K. Lee
*Director of the United States Patent and Trademark Office*